United States Patent
Gauggel

(10) Patent No.: US 7,854,361 B2
(45) Date of Patent: Dec. 21, 2010

(54) METHOD AND FACILITY FOR ASSEMBLING COMPONENTS OF A VEHICLE BODY

(75) Inventor: Gerd Gauggel, Ravensburg (DE)

(73) Assignee: ThyssenKrupp Drauz Nothelfer GmbH, Heilbronn (DE)

( * ) Notice: Subject to any disclaimer, the term of this patent is extended or adjusted under 35 U.S.C. 154(b) by 0 days.

(21) Appl. No.: 11/917,670

(22) PCT Filed: Apr. 24, 2006

(86) PCT No.: PCT/EP2006/061772

§ 371 (c)(1),
(2), (4) Date: Apr. 30, 2008

(87) PCT Pub. No.: WO2006/133988

PCT Pub. Date: Dec. 21, 2006

(65) Prior Publication Data

US 2009/0050679 A1    Feb. 26, 2009

(30) Foreign Application Priority Data

Jun. 16, 2005    (DE) .................. 10 2005 027 986

(51) Int. Cl.
*B23K 37/00* (2006.01)
(52) U.S. Cl. ............... 228/49.1; 228/49.6; 228/49.2; 228/4.1; 228/212; 219/652; 219/80
(58) Field of Classification Search ........... 228/49.6, 228/49.1, 49.8, 4.1, 212; 219/652, 80
See application file for complete search history.

(56) References Cited

U.S. PATENT DOCUMENTS

| | | | |
|---|---|---|---|
| 4,670,961 A | 6/1987 | Fontaine et al. | ............ 29/429 |
| 5,011,068 A | 4/1991 | Stoutenburg et al. | |
| 5,400,944 A * | 3/1995 | Zimmer et al. | ............ 228/49.6 |
| 5,409,158 A | 4/1995 | Angel | |
| 6,170,732 B1 | 1/2001 | Vogt et al. | ............ 228/4.1 |

FOREIGN PATENT DOCUMENTS

| | | |
|---|---|---|
| DE | 19 533 389 | 3/1997 |
| EP | 0 147 910 | 7/1986 |
| EP | 0 760 770 B1 | 3/1997 |
| EP | 0 968 073 B1 | 1/2000 |
| EP | 1 277 540 | 1/2003 |
| EP | 1 321 355 | 6/2003 |

OTHER PUBLICATIONS

International Search Report for PCT/EP2006/061772.

* cited by examiner

*Primary Examiner*—Kiley Stoner
*Assistant Examiner*—Erin B Saad
(74) *Attorney, Agent, or Firm*—Proskauer Rose LLP

(57) ABSTRACT

The assembly of body components using a geometry box (1) and clamping frames (7, 8) is described. At least for the larger components (9, 10), in particular the side wall parts of the body, a multipart clamping frame (8a, 8b) is used. The component (9, 10) is grasped and fed to the geometry box (1) using one clamping frame part, while the other clamping frame part is fed empty. Using both clamping frame parts, the component (9, 10) is then fixed precisely in position using positioning and fixing units acting between the geometry box (1) and the clamping frame (7, 8) in such a way that the components (6, 9, 10) to be connected to one another may be connected to one another, in particular welded.

4 Claims, 4 Drawing Sheets

METHOD AND FACILITY FOR ASSEMBLING COMPONENTS OF A VEHICLE BODY

CROSS-REFERENCE TO RELATED APPLICATIONS

This application is a National Phase Application of International Application No. PCT/EP2006/061772, filed Apr. 24, 2006, which claims the benefit of and priority to German Application No. 10 2005 027 986.4, filed Jun. 16, 2005, which is owned by the assignee of the instant application. The disclosure of each of the above applications is incorporated herein by reference in its entirety.

FIELD OF THE INVENTION

The present invention relates to a method for assembling components of a vehicle body in a processing station having a geometry box having positioning points, in which a component, in particular a floor group, is fixed precisely in position and to which clamping frames, on which the other components, in particular side wall parts, are retained precisely in position and using which they are guided to the geometry box, are clamped in the correct position and attitude in such a way that the components to be connected to one another are located in the desired attitude and are connected to one another in this attitude.

Furthermore, the present invention relates to a facility for assembling components of a vehicle body in a processing station having a geometry box, which has a lower construction having positioning and fixing units for the geometrical fixing of a component of the vehicle body, in particular its floor group, in the geometry box and for clamping frames for the other components on the geometry box and having transport devices for the clamping frames.

BACKGROUND OF THE INVENTION

Various methods and facilities for assembling components of a vehicle body are known. By using a geometry box and clamping frame for the components to be assembled, dimensionally accurate production of the vehicle bodies is achieved.

In a known method and a known facility (EP 0 760 770 B1), the geometry box is itself composed of the clamping frames, which are guided to the processing station using transport devices and are equipped with body parts. This means that the clamping frames are designed as very rigid and thus also very heavy. A correspondingly heavy transport device is required for feeding the clamping frames.

In another method and another facility (EP 0 968 073 B1), from which the present invention proceeds, a stationary geometry box is provided, in which a component of the vehicle body, in particular the floor group, assumes an exactly defined geometrical position to the geometry box on a lower construction. To guide the remaining components thereto, the geometry box is situated inside a complex component robot having various transport devices for the remaining components. A clamping frame is provided for each component to be added on. Therefore, clamping frames having a length of 4 to 6 meters are required. Because such clamping frames must be designed as sufficiently rigid for the clamping of the components on the geometry box in the correct position and attitude, they may have a weight of 2000 kg in practice. Such weights may no longer be manipulated using commercially available heavy load robots.

SUMMARY OF THE INVENTION

The present invention features a method and a facility for assembling components of a vehicle body, which no longer requires the use of complex transport devices for heavy clamping frames.

This can be achieved in a method of the type cited at the beginning in that, at least for larger components, such as side wall parts, multipart clamping frames are used, using whose clamping frame parts only one partial area of the component at a time is retained and clamped to the geometry box.

This can be achieved for the facility according to the present invention in that the clamping frames, at least for larger components, such as side wall parts, are divided into at least two clamping frame parts, of which one clamping frame part is set up to grasp, retain, and carry of the side wall part precisely in position and each further clamping frame part is at least set up to retain the side wall part precisely in position.

The present invention is based on the idea that rigid clamping frames are needed on the geometry box for applying the required clamping forces, but not for the transport of the components to the geometry box. It is therefore sufficient if the side wall part is not grasped over its entire area by the clamping frame during transport. Its weight may then be correspondingly light. This has the result that special transport devices designed for 2000 kg load are not needed for this purpose, but rather the transport may be performed using commercially available heavy load robots. The transport device also no longer has to be dimensioned as sufficiently large for the clamping frame parts to apply the clamping forces during assembly of the components. These forces may, as known per se, be built up by suitable positioning and fixing units which act between the geometry box and the clamping frame parts. A further advantage of the division of the clamping frame for each component into multiple clamping frame parts is that, as a function of the component type, various clamping frame parts (various modules) may be combined with one another. If, for example, for a side wall component, the forward area is identical for various body types, but the rear part differs, various rear clamping frame parts may be combined with the same forward clamping frame part. The positioning of the two clamping frame parts, namely the charged clamping frame part and the empty clamping frame part, preferably occurs in sequence. Using the clamping frame part charged with the component, e.g. a side wall component, this component is pre-positioned on the geometry box and in relation to the component already positioned in the geometry box, e.g. the floor group. The other empty clamping frame part is then guided thereto and the component is fixed thereon in the correct position and attitude. Finally, the final clamping of the clamping frame parts on the geometry box is performed. Because of the successive guiding of the clamping frame parts to the geometry box and the pre-positioning of the clamping frame part first guided to the geometry box, the transport device no longer required for the first clamping frame part may be used to guide the empty clamping frame part thereto.

In the following, the present invention is explained in greater detail on the basis of a drawing, which schematically illustrates the essential parts of the facility.

DESCRIPTION OF THE INVENTION

Figure 1:
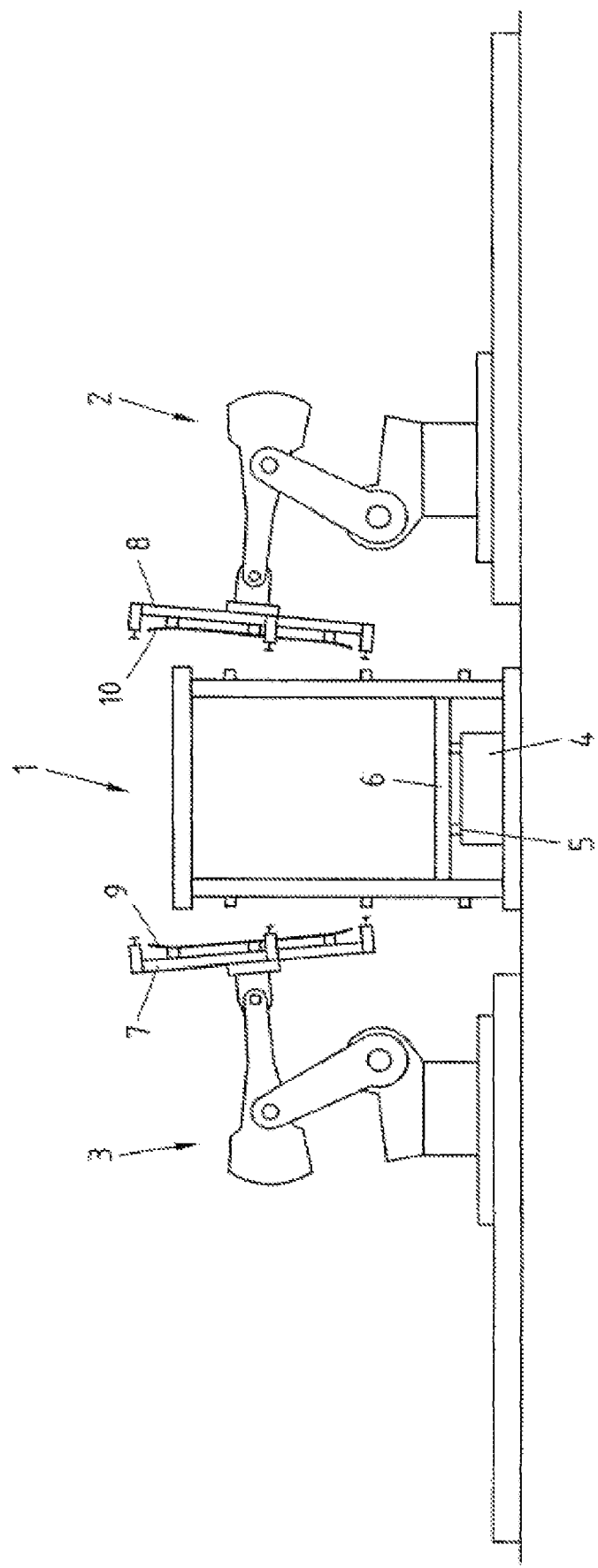
FIG. 1 shows a facility having a geometry box and heavy load robots, situated on both sides of the geometry box, having clamping frames in a front view.
Figure 3:
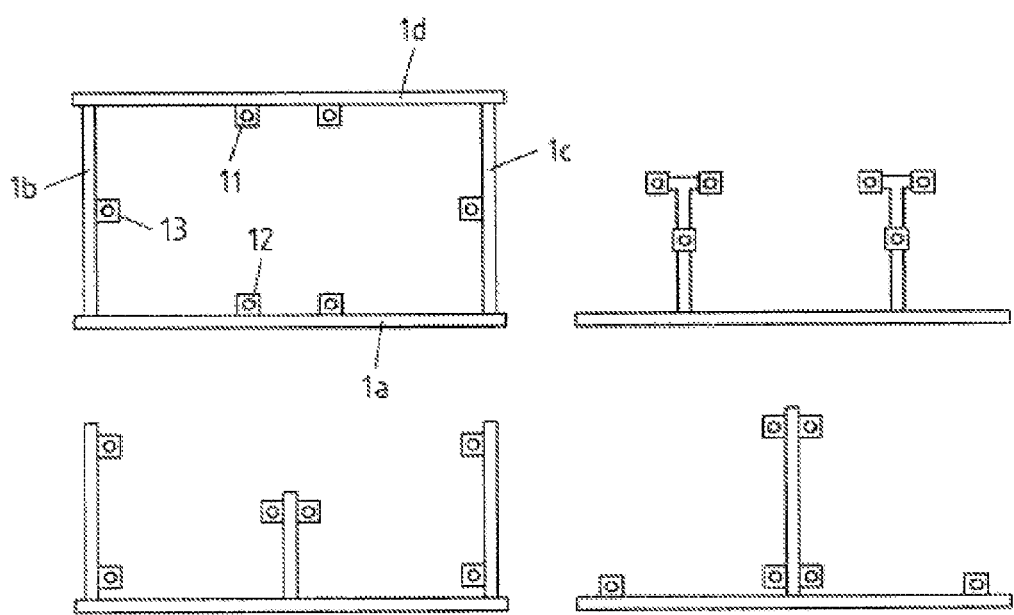
FIG. 3 shows positioning and fixing units for the clamping frames in various embodiments in a side view.
Figure 4:
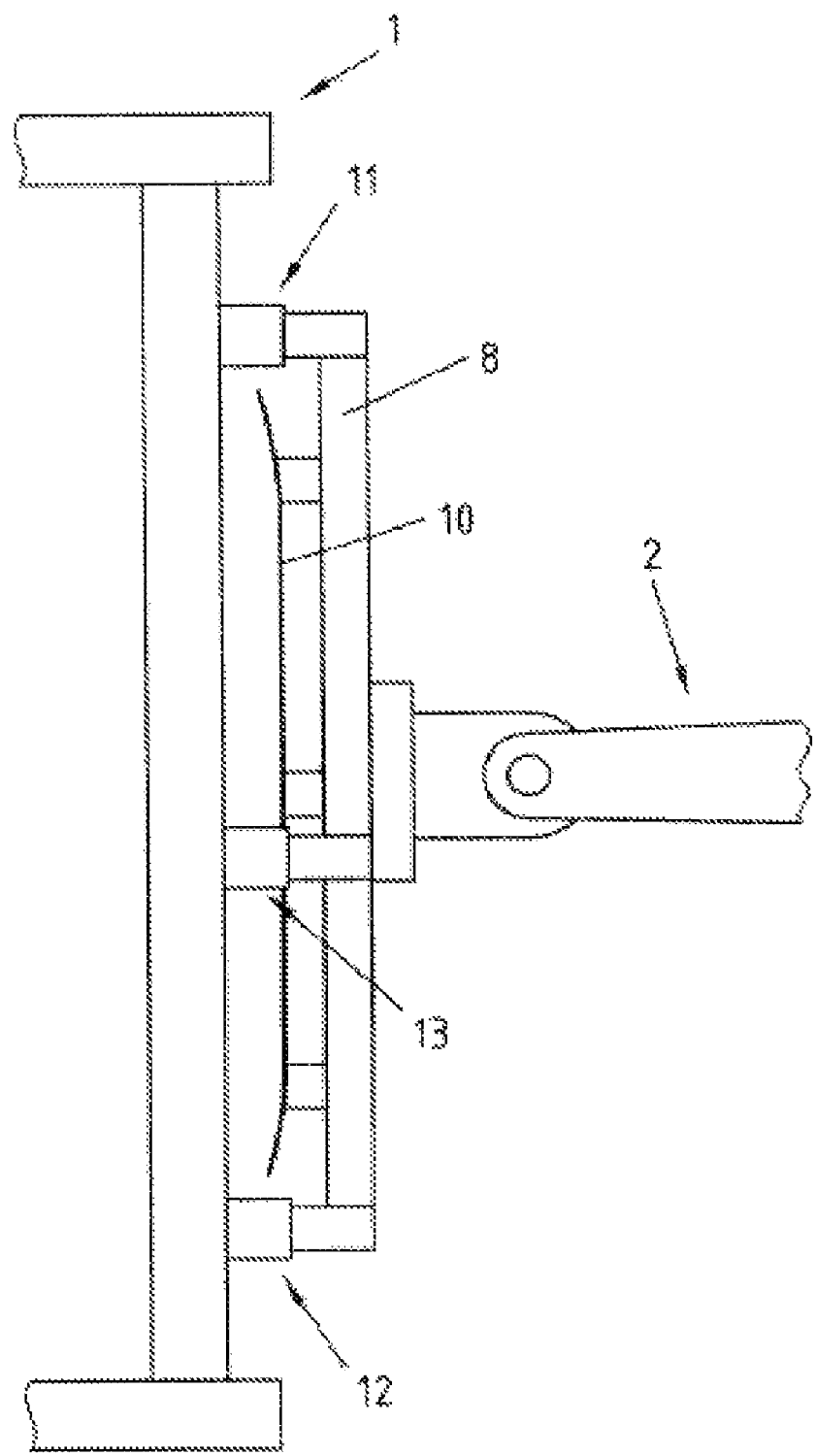
FIG. 4 shows the geometry box from FIG. 1 in detail in a front view.
Figure 5:
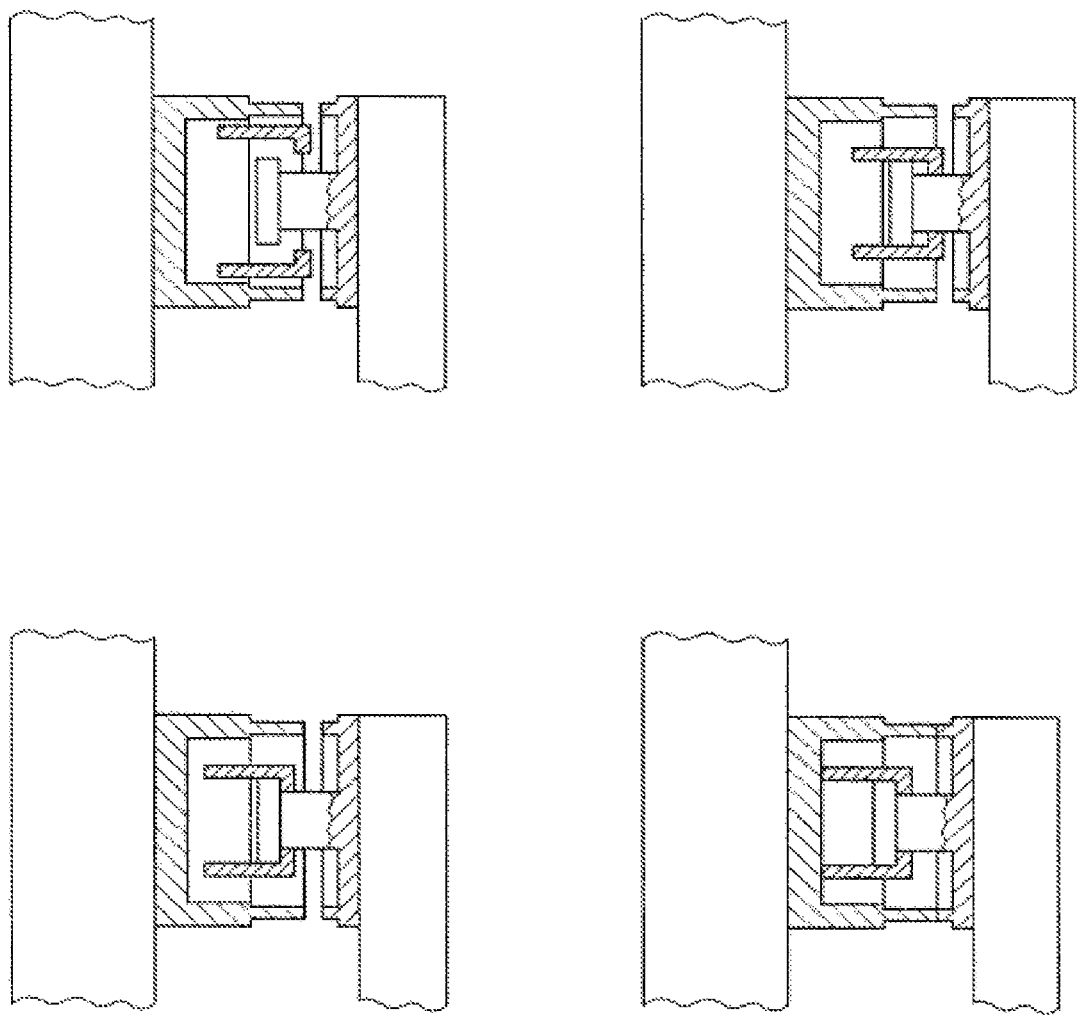
FIG. 5 shows positioning and fixing units on the geometry box and on a clamping frame in various phases of the positioning and fixing of the clamping frame.

The facility illustrated in FIG. 1 for assembling components of a vehicle body has a processing station. The processing station comprises a stationary geometry box 1, which is implemented as a frame construction. Various possibilities of the frame construction are shown in a side view in FIG. 3, of which the first exemplary embodiment comprises a floor baseplate 1a, lateral columns 1b, 1c, and a top girder 1d. Furthermore, on both sides of the geometry box 1, the processing station comprises heavy load robots 2, 3 and joining units (not shown), such as welding units, in particular a laser welding apparatus, soldering units, or the like, using which the components of the body to be assembled may be permanently connected to one another by welding.

A lower construction 4 is located inside the geometry box 1, which may be designed as a clamping frame and on which, using positioning and fixing elements 5, a component 6, in particular the floor group of the vehicle body, may be fixed precisely in position. Instead of a floor group, a cage-like vehicle structure may also be fastened. It is important that the positioning of the component 6 occurs exactly at predefined points on the geometry box 1, which are also used for positioning the clamping frames 7, 8 of the other components 9, 10. The clamping frame 7, 8 comprises multiple independent clamping frame parts 8a, 8b (see FIG. 2), which each have suitable gripping and retaining elements for fixing the components 10 precisely in position.

To connect other components, in particular a side wall part 10, to the component 6, the clamping frame part 8a, which grasps and retains the component 10 to be fed in the correct attitude in position in a partial area, is guided using the heavy load robot 2 to the geometry box 1 and pre-positioned here. For this purpose, interacting parts of the positioning and fixing units 11, 12 are provided on the geometry box 1 and the clamping frame 8a.

Figure 2:
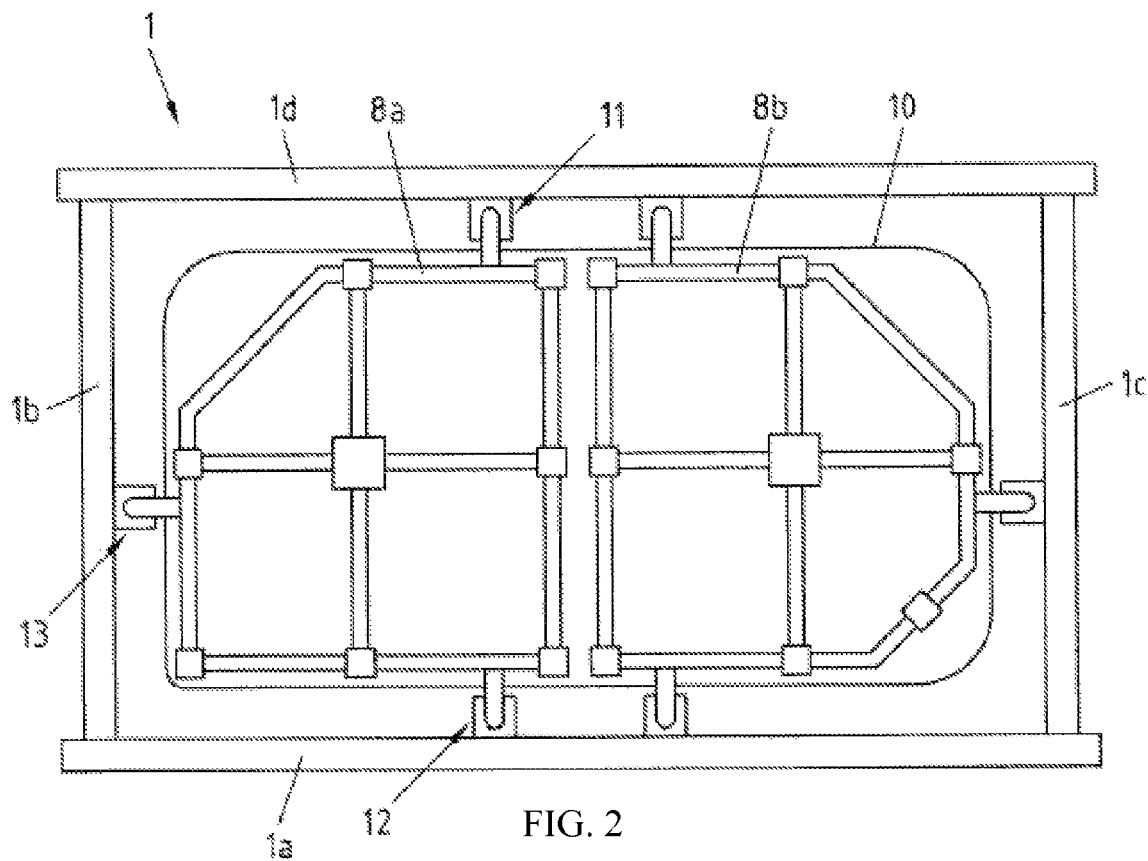
FIG. 2 shows the geometry box from FIG. 1 having two fixed clamping frames in a side view.

The geometry box 1 has multiple such positioning and fixing units 11, 12, 13 distributed over the area. FIG. 2 shows some alternatives for the distribution.

As soon as the clamping frame 8a is held pre-positioned on the geometry box 1 using the positioning and fixing units 11, 12, 13, the heavy load robot 2 may be decoupled from the clamping frame 8a. It is then available for receiving and feeding the other clamping frame part 8b to the geometry box 1 and/or to the free area of the components 10. Alternatively, the clamping frame part 8b may also be moved by another heavy load robot. As soon as both clamping frame parts 8a, 8b have grasped the component 10 and are pre-positioned using their positioning and fixing units 11, 12, 13 on the geometry box 1, all positioning and fixing units 11, 12, 13 are activated, so that, via the clamping frame parts 8a, 8b, the component 10 is brought into its final position on the already fixed component 6. The joined components 6, 10 may then be welded to one another.

The invention claimed is:

1. A method for assembling components of a vehicle body in a processing station having a geometry box with positioning points comprising:
   clamping and retaining in precise position a component of a vehicle body on the geometry box using a clamping frame;
   feeding another component of the vehicle body to the geometry box and retaining the another component in precise position on the geometry box using a clamping frame comprising multiple independent clamping frame parts;
   wherein the feeding and retaining is executed as follows:
      grasping the another component using only one clamping frame part of the multiple independent clamping frame parts;
      pre-positioning the only one clamping frame part and the another component on the geometry box in relation to the component already retained on the geometry box;
      feeding an empty clamping frame part of the multiple independent clamping frame parts to the another component pre-positioned on the geometry box;
      fixing in precise position the another component by grasping the another component using the empty clamping frame part;
      activating positioning and fixing units on the geometry box so that via the clamping frame parts the another component is brought into final position on the component already retained on the geometry box.

2. The method of claim 1 wherein the feeding of the clamping frame part charged with the another component of the vehicle body is performed with a transport device, and wherein the feeding of the empty clamping frame part is performed with the same transport device.

3. The method of claim 1 wherein the component of a vehicle body which is fixed precisely in position in the geometry box comprises a floor group of the vehicle body.

4. The method of claim 1 wherein the another components of the vehicle body comprises a side wall part of the vehicle body.

* * * * *